United States Patent
Bechtel

[11] 3,944,818
[45] Mar. 16, 1976

[54] PHOTOELECTRIC GUARD

[75] Inventor: Klaus Bechtel, Osthofen, Germany

[73] Assignee: Visomat-Gerate GmbH, Mainz, Germany

[22] Filed: Sept. 17, 1974

[21] Appl. No.: 506,837

Related U.S. Application Data

[63] Continuation-in-part of Ser. No. 344,551, March 26, 1973, abandoned.

[30] Foreign Application Priority Data

Mar. 28, 1972 Germany............................ 2215136

[52] U.S. Cl.............. 250/221; 210/209; 340/258 B
[51] Int. Cl.²......................................... G01D 21/04
[58] Field of Search ........... 250/221, 222, 208, 209; 340/258 R, 258 B; 250/206, 214 R

[56] References Cited
UNITED STATES PATENTS

| | | | |
|---|---|---|---|
| 2,912,683 | 4/1959 | Bagno | 340/258 B |
| 3,742,222 | 6/1973 | Endl | 250/209 |
| 3,787,700 | 1/1974 | Chasson | 250/222 X |
| 3,810,148 | 5/1974 | Karsten et al. | 250/221 X |
| 3,859,647 | 1/1975 | Ross | 340/258 B |

FOREIGN PATENTS OR APPLICATIONS 728,331  11/1942  Germany.......................... 340/258 B

*Primary Examiner*—Walter Stolwein
*Attorney, Agent, or Firm*—Holman & Stern

[57] ABSTRACT

This invention relates to a protective guard for surrounding hazardous parts of a machine. The guard comprises a photoelectric barrier, connected to a circuit which will shut down the machine both when the photoelectric beam is broken, and also when a part of the photoelectric system fails to operate correctly.

5 Claims, 2 Drawing Figures

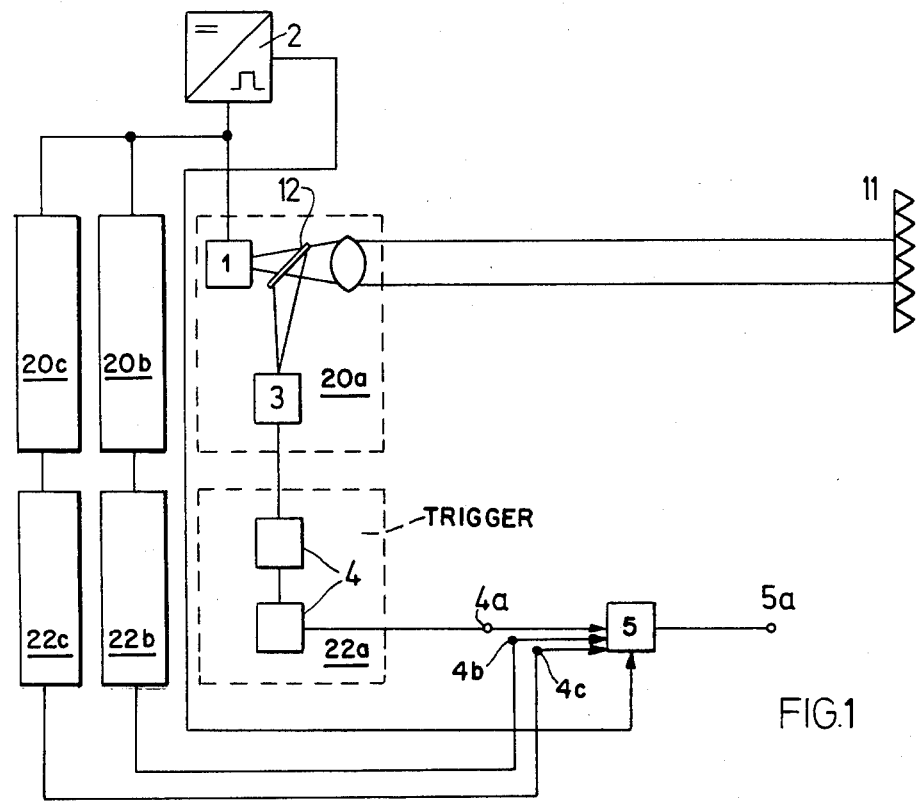
FIG.1
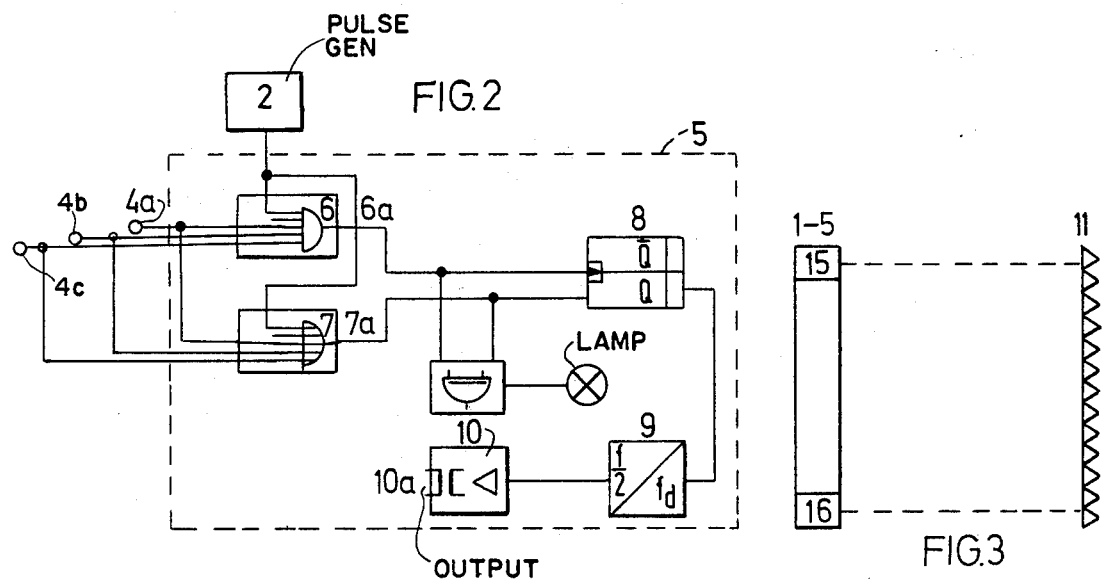
FIG.2
FIG.3

PHOTOELECTRIC GUARD

This application is a continuation-in-part of my co-pending application, Ser. No. 344 551 filed Mar. 26, 1973, now abandoned.

FIELD OF THE INVENTION

The invention relates to a photoelectric guard barrier which can enclose hazardous parts of a machine tool and cause the tool to be shut down when a body enters the hazard zone.

BACKGROUND OF THE INVENTION

Previously, the following systems have been known to the prior art:

1. Using a single-beam system the light of a series of incandescent projection lamps is directed to a series of coordinated photo-receivers after the light has traversed the protection zone. The photo-receivers are all illuminated and are therefore conductive only if none of the light beams is interrupted. The disadvantage of this system is that the dark conductivity of one or more photo-receivers cannot be readily detected and consequently the affected photo-receivers signal the bright state even if the light beam is interrupted and do not result in the machine being shut down.

2. A further prior art system utilizes an incandescent projection lamp, an optical system, a semi-transparent reflector, a rotary reflector and a parabolic reflector. The rotary reflector is situated at the focal point of the parabolic reflector and light emitted by the lamp is projected at different angles of incidence on to the parabolic reflector, thus producing parallel motion of the light beam. The pencil of light strikes a reflector, is reflected into itself, is coupled on to the photo-receiver through a semi-transparent reflector and produces a photoelectric current. Entry into the protected zone results in a brief interruption of the pencil of light which moves parallel to itself. Such a pulse may be adapted to shut down the machine.

Disadvantages of the system are due to the need for using a relatively expensive optical system and the limited adaptation facilities.

3. A further prior art system utilizes a fluorescent tube instead of incandescent projection lamps, the light of the said fluorescent tube being projected via individual optical systems on to appropriately coordinated photo-receivers so that alternating voltage signals are produced by virtue of the alternating voltage feed of the fluorescent lamp. These signals are able to stop the machine.

A disadvantage of this system is its sensitivity to external light since fluorescent lamps are also used for illuminating working rooms.

4. Gallium-arsenide diodes, which have since been developed for these and other purposes may also be used in photoelectric guards in place of projection lamps and fluorescent tubes, digital processing of the pulses being performed according to a prior art technique by an AND-network or a multi-vibrator logic system which replaces such a circuit. Relatively substantial proneness to trouble is a disadvantage of this system.

OBJECT OF THE INVENTION

It is an object of the invention to provide an improved photoelectric guard which reduces the incidence of the above recited disadvantages of the prior art.

SUMMARY OF THE INVENTION

According to the present invention there is provided a photoelectric guard barrier which includes:

a pulse generator for providing a train of binary pulses.

A plurality of luminescence diodes is included for respectively emitting light output pulses in response to the output pulses of said generator operatively associated therewith.

A plurality of photo-receivers is also included the number of which is equal to the number of said luminescence diodes, each of said photo-receivers being operatively arranged to receive said light output pulses from respective ones of said luminescence diodes and providing output signals representative thereof.

A trigger circuit is included for each photo-receiver providing a one output when each said photo-receiver senses light and providing a signal above a preselected threshold.

A NAND-gate is included having one input coupled to the pulse generator and remaining inputs coupled respectively to each said trigger circuit, said NAND-gate providing a O output when said trigger circuits and said pulse generator simultaneously provide a one output.

An OR-gate is included having one input connected to said pulse generator and remaining inputs connected respectively to each said trigger circuit, said OR-gate providing a one output when either said pulse generator provides a one output or any of said trigger circuits provides a one output.

A master slave flip-flop is included coupled to said NAND and said OR-gate, a O output from said NAND-gate setting the normal output of said flip-flop into a one state and a one output from said OR-gate resetting the normal output of said flip-flop into the O stage. During operation of the guard barrier system, said master slave flip-flop provides a one output when all said photo-receivers sense bright from said light output pulses and a O output when all said photo-receivers sense dark during the intervals between said light output pulses. The flip-flop is neither set nor re-set when light does not reach at least one of said photo receivers and when at least one photo-receiver senses dark in the presence of light, thereby providing a constant output.

DESCRIPTION OF THE FIGURES

The invention will now be further described, by way of example, with reference to the accompanying drawing in which:

FIG. 1 shows the entire circuit. One optics block 20a, shown in detail, is identical to the optics blocks 20b and 20c. One trigger block 22a, shown in detail, is identical to the trigger blocks 22b and 22c.

FIG. 2 shows, in greater detail, the circuit part designated by the numeral 5 in FIG. 1.

FIG. 3 is a supplementary device for adjusting the photoelectric guard.

DISCUSSION OF THE PREFERRED EMBODIMENT

A series of any desired number of reflex light barriers with luminescence diodes 1 of conventional construction are used to provide light emitters, the said diodes being driven by a common pulse generator 2. The resulting light pulses traverse the protected zone and, after being reflected by the reflector 11, strike semi-transparent reflectors 12 from which they are deflected on to coordinated photo-receivers 3 which produce pulse-like changes of the photo current. Selective amplifiers 4 which are tuned to the light pulse frequency are driven by changes of photoelectric current and supply rectangular pulses which are digitally processable. These pulses are necessarily of identical frequency and, taking into account the high light velocity and the relatively short path of the light pulses, are in phase with the pulse generator pulses which drive the luminescence diodes. The said pulses may therefore be utilized for timing the digital evaluation of the photo-receivers so that in conjunction with the monochromatic light senders employed and the corresponding receivers the system offers optimum reliability against the intrusion of external light.

The signals supplied by the photo-receivers are digitally processed in a modified equivalence circuit 5. The circuit delivers output pulses 5a with the same timing ratio only if 1. all photo-receivers sense bright light during the light pulses, 2. all photo-receivers sense dark during the intervals between light pulses, 3. all components in the sender, receiver and logic evaluation system operate perfectly, 4. if there is all receiver signals entry into the protected zone.

The evaluation circuit (FIG. 2) combines all over lines 4a, 4b, 4c, etc. and control pulses at every moment of time. It checks whether all photo-receivers sense bright at the time of the light pulses and sets a flip-flop (a) which is disposed at the output. It checks whether all photo-receivers sense dark at the time of the light puls intervals and then resets the flip-flop (b). The flip-flop is therefore alternately set and reset for as long as all photo-receivers sense bright and dark at the rhythm of the light pulses.

One of the possible equivalence circuits is shown in FIG. 2. When a 1 signal arrives at 4a simultaneously with the synchronizing pulse from the generator 2, the output 6a of the NAND-network 6 will be equal to zero and the output 7a of the OR-network 7 will be equal to 1. The output 6a sets the flip-flop 8 and sets the output Q of said flip-flop into a 1 state. When the signal becomes zero during the synchronizing pulse intervals at 4a, the output 6a of the NAND-network 6 will become equal to 1, and the output 7a of the OR-network will become equal to zero and reset the flip-flop 8. The output Q of the flip-flop will then be in the zero position. Accordingly, square-wave pulses wil thus be available at the output Q of said flip-flop. The flip-flop selected in the example is a master-slave flip-flop which switches when supplied with negative pulse flanks.

The remarks made in relation to an input 4a from a receiver 3 in optics block 20a and trigger block 22a also apply to all signals which appear simultaneously on lines 4b, 4c, etc. from any desired number of receivers in optics blocks 20b, 20c, etc. and trigger blocks 22b, 22c, etc. of the photoelectric guard, shown in FIG. 1.

The square-wave pulses which are available at the output Q of the flip-flop are divided by the flip-flop 9, which is used as frequency divider, so that the output delivers pulses whose duration is equal to the pulse duration. The pulses are amplified in the amplifier 10 and are d.c. coupled to the output. The signal at the output, 10a may be used for directly driving a thyristor or a switching stage.

In the event of entry into the protected zone one or more of the photo-receivers remain dark, even if a light pulse is transmitted and the flip-flop can be neither set nor reset. Also, if no entry takes place and one or more photo-receivers sense dark at the time of the light pulses or sense bright at the time of the intervals between the light pulses it will also be impossible for the flip-flop to be either set or reset. Also, the signal lamp L will indicate the fault in the system by optical means.

In order to obtain maximum output energy the pulse frequency is divided in a second flip-flop so that pulses at half the frequency of the control pulses but with the same timing ratio (pulse interval — pulse duration) are available at the output.

FIG. 3 shows a supplementary device for adjusting the reflector or the sender/receiver system respectively. Radiation sources 15 and 16 with wavelengths in the visible spectrum are provided at the lower and upper end of the sender/receiver system 1 - .5. The pencils of light may be recognized on the reflector 11 and, in conjunction with register marks, are used to monitor the reflector position. The reflector is provided with adjusting means which permit alignment on all directions.

The system may be constructed as a reflex system or as a sender/receiver system.

I claim:

1. A photoelectric guard barrier comprising:

a pulse generator for providing a train of binary pulses;

a plurality of luminescence diodes connected to said pulse generator so as to emit, respectively, light output pulses in response to the output pulses of said generator;

a plurality of photo-receivers the number of which is equal to the number of said luminescence diodes, each of said photo-receivers being operatively arranged to receive said light output pulses from respective ones of said luminescence diodes and providing output signals representative thereof;

a trigger circuit for each photo-receiver providing a one output when each said photo-receiver senses light and providing a signal above a preselected threshold;

a NAND-gate having one input coupled to the pulse generator and remaining inputs coupled respectively to each said trigger circuit, said NAND-gate providing a 0 output when said trigger circuits and said pulse generator simultaneously provide a one output;

an OR-gate having one input connected to said pulse generator and remaining inputs connected respectively to each said trigger circuit, said OR-gate providing a one output when either said pulse generator provides a one output or any of said trigger circuits provides a one output;

a master slave flip-flop coupled to said NAND and said OR-gate, a 0 output from said NAND-gate setting the normal output of said flip-flop into a one state and a one output from said OR-gate resetting the normal output of said flip-flop into the 0 stage;

said master slave flip-flop providing a one output when all said photo-receivers sense bright from said light output pulses and a 0 output when all said photo-receivers sense dark during the intervals between said light output pulses;

said flip-flop being neither set nor re-set when light does not reach at least one of said photo-receivers and said generator pulse is present or when at least one photo-receiver senses light and said generator pulse is absent, thereby providing a constant output.

2. A photoelectric guard barrier as claimed in claim 1, comprising a frequency divider connected to the output of said flip-flop whereby output pulses from the flip-flop and the intervals between them are arranged to be both of the same duration.

3. A photoelectric guard barrier as claimed in claim 2, further comprising an impedance converter stage driven by said frequency divider.

4. A photoelectric guard as claimed in claim 3, wherein the signal from said impedance converter drives a thyristor.

5. A photoelectric guard as claimed in claim 3, wherein the luminescent diodes emit narrow beams and are disposed at the upper and lower end of the guard, and corresponding register marks are provided to permit the alignment of the guard to be checked.

* * * * *